United States Patent Office 3,359,872
Patented Dec. 26, 1967

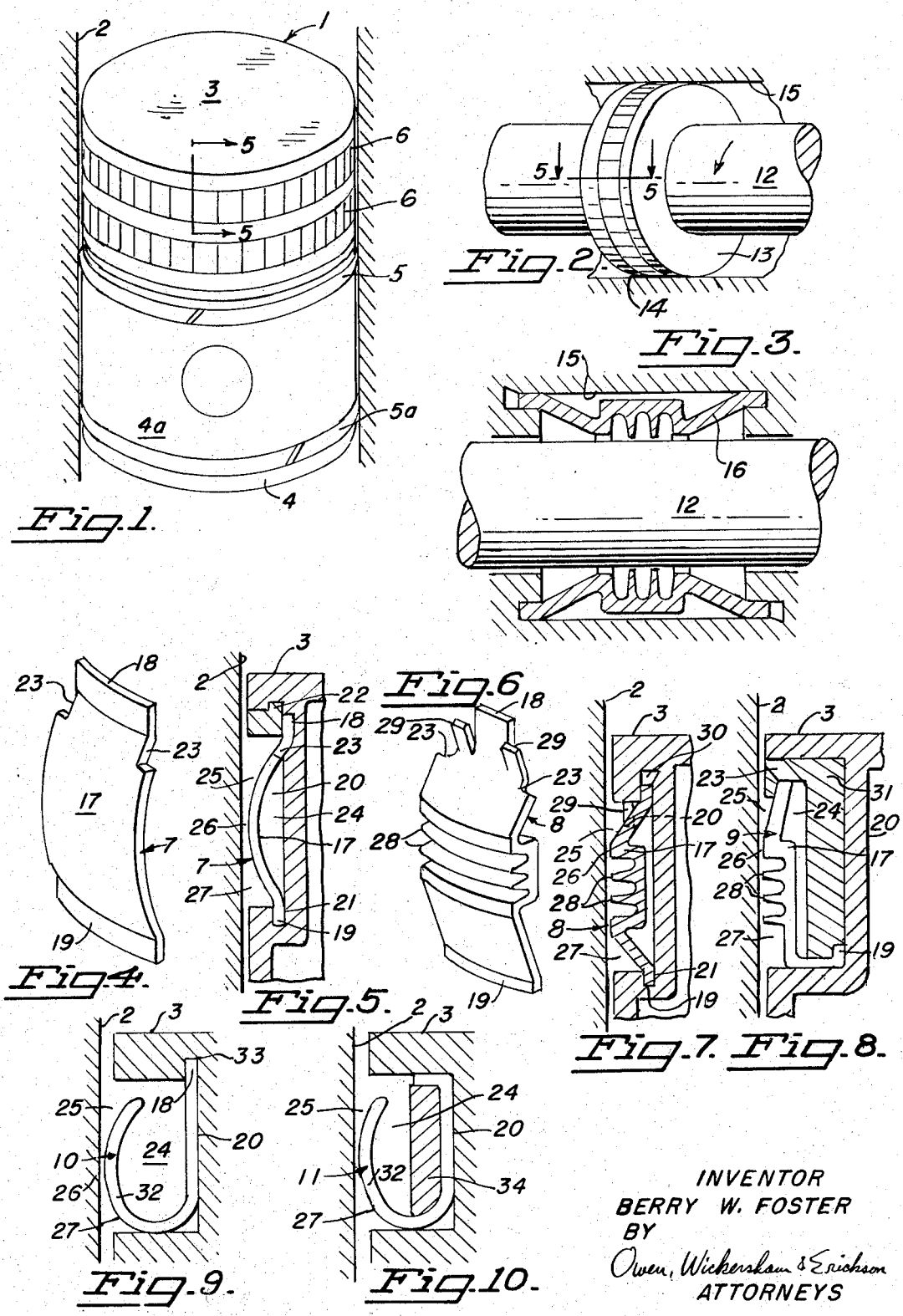

3,359,872
FLUID PRESSURE SEAL RINGS
Berry W. Foster, Santa Monica, Calif.
(2415 Thomas Ave., Redondo Beach, Calif. 90278)
Filed Oct. 22, 1965, Ser. No. 501,317
18 Claims. (Cl. 92—172)

This invention relates to improvements in seal rings. Its purpose is to reduce the leakage of fluid from the high pressure side to the low pressure side of a moving part such as a reciprocating piston or a rotating shaft.

The basic novel principle of this invention is that the flow of a small fraction of the working fluid is used to support the seal ring with a minimum of clearance so that the fluid flow and pressure losses are reduced to a minimum. While, in the past, liquid and gas bearings have been used to support reciprocating pistons and rotating shafts, it is believed to be new to employ fluid bearings whose only function is to support sealing rings at a minimum clearance between the ring and the moving part.

In piston engines and compressors, seal rings which require oil lubrication are the most common means of reducing the leakage of gas from the cylinder into the crankcase. The rings near the hot cylinder gases are difficult to lubricate with oil and in many cases the oil cracks and forces the rings to stick, so that they are no longer effective. Also, a ring which fails to get oil lubrication tends to produce undesirable wear on the cylinder wall. The blow-by gases in the engine crank case can be reduced to a minimum by making the seal rings fully effective.

The gas-bearing-supported seal ring of this invention does not require any oil lubrication; therefore it may be operated at higher temperatures than an oil lubricated ring. The gas being compressed or expanded in the piston engine is the lubricating fluid used in this invention to support the seal rings; therefore, a complicated oil system is not necessary in order for the seal rings to contain the cylinder gases. The piston may have oil-seal rings at its lower skirts near the crank end so that side loads on the piston may be supported by oil lubrication between the piston and the cylinder. These oil seal rings near the central and crank end of the piston are protected from such troubles as oil cracking and sticking rings, because the gas-seal ring lets very little of the hot gas flow to the oil-seal rings.

In some compressed gas machinery it is undesirable to let oil leak into the cylinder gases. The gas-bearing-supported seal ring of this invention does not introduce any oil into the cylinder gases.

This gas-bearing-supported seal ring makes it easier to lubricate the seal rings of most two-cycle engines, where there is an exhaust and/or intake sleeve port near the crank end of the cylinder; for example, it should be very useful in the two-cycle engine described and claimed in my co-pending application Serial No. 491,527, filed September 30, 1965. In such engines, it has heretofore been difficult to lubricate the gas-seal rings near the hot gases at the cylinder head, but the present invention provides an oil-free seal ring, which can operate at higher temperatures than the normal seal ring. There has been a tendency for the oil that lubricates the seal ring of a two-cycle engine to leak into the sleeve ports as the ring moves past it. By keeping the oil-seal ring for the oil-lubricated bearing surface of the piston near the crank end so that the oil rings will not pass over the cylinder ports, the present invention holds the oil leakage into the sleeve ports to an insignificant amount. In fact, a two-cycle engine with gas-bearing-support seal rings and with piston oil lubricating confined to the crank end, uses no more oil than a comparable four-cycle engine; indeed it may use less oil than a four-cycle engine which oil-lubricates the hot seal rings near the cylinder head.

One novel feature of this invention is that the seal ring has a flexible support with respect to the piston or shaft, so that the gas force acts on it to keep it at a minimum clearance from the cylinder and housing. When there are no dynamic gas loads acting on the seal, a spring supports the seal and holds it with a small clearance between the seal and cylinder for piston application (or between the seal and the shaft or housing for rotary shaft application). In the preferred design, both sides of the seal have the same total pressure head, and flow of air between the seal and cylinder for piston applications (or between the seal and the shaft or housing for rotary shaft application) reduces the static head between these surfaces; thus, the static head on the other side of the seal closes the fluid bearing gap between the moving parts. This gap gradually closes until the gas forces and spring forces are in equilibrium. In an alternate form of the invention, the gas loads act to force the seal away from the moving part and either spring force or centrifugal force helps to hold the clearance between the moving parts to a minimum.

Another novel feature of this invention is that the seal ring has labyrinth seals as an integral part of it. The labyrinth seals preferably have protruding thin edges which are easily worn to the radius which gives the optimum seal.

Another novel feature of this invention is that the seal rings are fabricated as an arc segment which fit together to form a circular ring. In the preferred design grooves in the piston or shaft or housing hold these segments in place as a circular ring. A spring latch may be used, so that the arc segments can be easily inserted into the slots and latched in place. In an alternate form of the invention, the arcs are flexible enough so that they can be buckled to snap into place in the grooves to form a circular ring. These arc segments may be fabricated as standard-size parts to reduce the cost of production. In an alternate form, a split circular ring spring is used to hold the arc segments as a circular ring in the seal ring groove. Still another form of the invention uses a combination of a split circular ring spring and grooves in the piston or shaft or housing to hold the arc segments in place as a circular ring. These seal rings may be used on parts which have very little relative motion as well as on parts with large relative motion.

In the drawings,

FIG. 1 is a fragmentary view in perspective and partly in section of a piston in a cylinder; arcuate segments embodying the principles of the invention are fitted into the piston groove to form a circular sealing ring.

FIG. 2 is a fragmentary view in perspective and partly in section of a rotating shaft in a housing, with arcuate segments fitted into shaft grooves to form a circular seal ring embodying the principles of this invention.

FIG. 3 is a fragmentary view in elevation and partly in section of a shaft and housing, with arcuate segments fitted into the housing to form a circular seal ring around the shaft, also embodying the principles of the invention.

FIG. 4 is an enlarged perspective view of one form of arcuate segment for the seal ring.

FIG. 5 is an enlarged fragmentary view in section taken along the line 5—5 in FIG. 1 (and in FIG. 2) of the seal ring made up of arcuate segments of FIG. 4.

FIG. 6 is an enlarged perspective view of a preferred form of arcuate segment for the seal ring.

FIG. 7 is a view like FIG. 5, incorporating a seal ring made up of arcuate segments of FIG. 6.

FIG. 8 is an enlarged view in section similar to FIG. 7 of a modified form of the invention wherein a split-circular spring holds the arcuate segments in a circular ring.

3

FIG. 9 is a view similar to FIG. 5 showing a modified, simplified form of seal ring using arcuate segments which buckle and snap into the retaining groove.

FIG. 10 is a view similar to FIG. 9 with a further modified form of split-circular spring holding the arcuate segments in a circular ring. This form of the invention may be used in the seal grooves of the piston engines in current use.

FIG. 1 shows one type of installation incorporating my novel seal ring. A piston 1 reciprocates in a cylinder 2. The diameter of the piston head-end 3 may be several thousandths of an inch less than the diameter of its crank-end 4; thus, all the side loads on the piston are taken on the bearing surface of the piston skirt 4a, which may extend from about midway of the piston down to its crank end 4. The diameter of this skirt 4a may be constant within the tolerances which give a tight bearing fit within the bore of cylinder 2. The piston skirt 4a may be provided with oil rings 5 and 5a to help to retain the lubricating oil in the crankcase. The head end 3 of the piston 1 is provided with seal rings 6 embodying the principles of this invention. These seal rings 6 may be seated in grooves in the piston 1 and may be fastened to the piston 1 by means of a spring—for example, the flexural spring of the beam for the arc segments shown in FIGS. 4 and 10. Each seal ring 6 is supported as a gas bearing by the fluid which is being compressed or expanded in the cylinder 2; thus, no oil lubrication is required by the seal rings 6. The seal rings 6 may be built up from arcuate segments 7 shown in FIG. 4 (or from any of the segments 8, 9, 10 or 11 in FIGS. 6 to 10), which will be discussed later. For internal combustion engines such as the Otto cycle and diesel cycle engines, the seal rings 6 can operate at a higher temperature than an oil-lubricated ring because they do not require oil, which tends to crack and to cause the rings to stick, as well as producing abrasive carbon.

FIG. 2 shows the seal ring of this invention installed around a rotary shaft 12, which rotates in housing 15 and is supported by conventional bearings (not shown). A seal disc 13 is mounted on the shaft 12 and rotates with it. A seal ring 14 of this invention is mounted in a groove in the disc 13 and is fastened to it by means of a spring. Like the seal ring 6 of FIG. 1, the seal ring 14 may be built up from the arcuate segments 7 of FIG. 4 or from any of the segments 8, 9, 10 and 11 in FIGS. 6 to 10.

In the FIG. 2 design, the seal ring 14 experiences a centrifugal force as well as the gas pressure forces. The rotary shaft seal design of FIG. 3 eliminates the centrifugal force from its seal ring 16 by mounting it in a groove in a non-rotating housing 15.

The arcuate segment 7 of FIGS. 4 and 5 has an arcuate surface, and it forms an arch beam 17 which has a flexural spring action. The arch beam 17 has tabs 18 and 19 at its ends to retain the segments as a seal ring. The arcuate segments 7 fit into a groove 20 in the piston 1 or rotary disc 13, and the groove 20 may have a slot 21 at its lower inner corner for the tab 19 to fit into. A split-ring spring 22 may hold the upper tab 18 so that the arcuate segments will be retained in the groove 20 as a seal ring 6 or 14 or 16, the arcuate segments 7 fitting tightly together so that there will be very little leakage between them.

A notch 23 may be provided at the upper corners of the arcuate segments 7, located near the high pressure head end 3 of the piston 1 or the rotary disc 13. High pressure fluid (more specifically, gas) flows from the head end 3 of piston 1 through the opening provided by adjacent notches 23, to the back or inner side of the segments 7 into a cavity 24, where the static head is equal to the total pressure head, once the cavity 24 is full, since very little fluid flows out of it. Also, a small fraction of the fluid flows through the converging nozzle 25 formed by the upper and outer surface of the arch 17.

4

The velocity of the fluid increases as it passes through the conveying nozzle 25, and it is greater when it flows through the throat or bearing section 26. The total pressure head is substantially the same on the inner and outer surfaces of the arcuate segment 7; however, the static pressure on the inner surface is greater than the static pressure on the outer surface. This can best be explained by use of Bernoulli's equation:

(1) $$P_o + \frac{PV_o^2}{2} = \text{constant} = P_i + \frac{PV_i^2}{2} = P_i$$

(since $V_i = 0$)

where:
  $p$ is the static pressure
  $P$ is the mass density of the fluid
  $V$ is the velocity of the fluid, and
  The subscripts $o$ and $i$ stand respectively for the inner and outer surfaces From Equation 1 it is apparent that the static pressure $p_i$ at the inner surface of the arcuate segment 7 is greater than the static pressure $p_o$ at its outer surface. Thus the arch spring 17 flexes and deflects, and the bearing surface 26 moves closer to the cylinder 2. As a result, the velocity $V_o$ and the velocity head $PV_o/2$ are increased further at the expense of the static head $p_o$. The arch spring face and the pressure forces on the arch 17 and bearing 26 soon reach an equilibrium position. The flow of fluid past the bearing 26 prevents the seal from actually contacting the cylinder 2. The arch 17, spring 22, nozzle 25 and bearing 26 are designed relative to each other to reduce the flow of fluid past the bearing 26 to a minimum without metal surface contact between the segment 7 and the cylinder 2. Due to the flow losses through the bearing 26 and the nozzle 25, the total head in the lower divergent nozzle 27 has to include a turbulent or heat loss; thus it has a lower velocity and static head than the comparable values in the nozzle 25.

When the piston 1 moves toward the head end of the cylinder 2, there is a fluid pumping action which increases the flow through the nozzle. Similarly, the fluid pumping action reduces the flow through the nozzle when the piston moves away from the head or high pressure end.

In the rotating seal 14 of FIG. 2 the centrifugal force of the segments tends to close the nozzle, so that the static pressure in the cavity 24 may have to be reduced to compensate for this centrifugal force of the rotating seal.

The arcuate segment 8 of FIGS. 6 and 7 is similar to the arcuate segment 7 of FIGS. 4 and 5, and the corresponding parts are given the same numbers. Only the additional features need be explained. At the center of arch 17, there is at least one circular arc labyrinth seal 28 (two seals 28 are shown in FIGS. 6 and 7). These labyrinth seals 28 help to restrict the flow past the seal ring made up of the segments 8, thus making this form of the invention more effective than the simple segment 7. Spring latches 29 may be provided at the upper end of the arcuate segment 8, and a trapezoid slot 30 may be provided at the upper corner of the groove 20. To insert the arcuate segments 8 into the groove 20, the latches 29 are held parallel with the tab 18 and are inserted into trapezoid slot 30 with the segment 8 in a diagonal position with respect to the groove 20. The tab 18 and latches 29 are inserted far enough into the slot 30 so that the tab 19 can be positioned to fit into the slot 19. When the tab 19 is forced snugly into the slot 21, the latches 29 snap out of the slot 30 and hold the arcuate segment 8 in place in the groove 20. The operation of this arched arcuate segment 8 is similar to that of the arched arcuate segment 7, with the added feature of the labyrinth seals 28 to make it more effective. The labyrinth seals may have sharp tips which will easily wear off to a height which makes them more effective in restriction in the fluid flow without contact of the segment 8 with the cylinder 2 after the desired wear is obtained.

The arcuate segment 9 of FIG. 8 is similar to the arcuate segment 8 of FIGS. 6 and 7. The difference between them is that the segment 9 uses a split-ring spring 31 to hold the segments 9 in place in the groove 20 instead of the slots 21 and 30 and the latches 29. The operation of the segment 9 is otherwise similar to that of the segment 8.

The arcuate segment 10 has an arched surface and it forms a cantilever beam 32. The segment 10 is retained in the groove 20 by buckling the beam 32 and inserting the tab 18 into the slot 33; when the arc segment 10 assumes its preferred spring state, it holds itself in the groove 20. The operation of the segment 10 is similar to that of the segment 7.

The arcuate segment 11 is similar to the segment 10, the difference between them being that the segment 11 uses a split ring spring 34 to hold the segments in place in the groove 20.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Seal means in an engine for restricting the flow of fluid from a high pressure side to a low pressure side of two mating cylindrical engine parts which move freely with respect to each other, said seal means comprising a seal ring and mechanical spring means for seating said seal ring in and connecting it to one of said mating parts closely adjacent the second said mating part, said seal ring having an arched surface and perforations therethrough providing converging nozzle means and fluid bearing surface means for causing a very small flow of said fluid past said seal ring to oppose said spring force and to reduce the clearance between said seal ring and its said second mating part, thus reducing said flow to a minimum, said fluid that does flow between said bearing surface and said second mating part thereby serving to lubricate these surfaces and to prevent metal-to-metal contact as said mating parts move freely relatively to each other.

2. The device of claim 1 wherein said two mating cylindrical parts are a reciprocating piston and a cylinder, said seal ring being seated in and connected to said piston by said mechanical spring means.

3. The device of claim 1 wherein said fluid is a gas.

4. The device of claim 1 wherein said fluid is a liquid.

5. The device of claim 1 wherein said two mating cylindrical parts are a rotating shaft and a housing.

6. The device of claim 5 wherein said seal ring is seated in and connected to said rotating shaft by said mechanical spring means.

7. The device of claim 5 wherein said seal ring is seated in and connected to said housing by said mechanical spring means.

8. The device of claim 1 wherein said seal ring incorporates an arched portion housing labyrinth seal means thereon which moves with said seal ring to help restrict the flow of fluid past it.

9. The device of claim 1 wherein said seal rings are comprised of a plurality of arched arcuate segments which fit together.

10. A seal ring for restricting the flow of fluid from a high pressure head end to a low pressure crank end of a piston which reciprocates in a cylinder, said seal ring being adapted to be sealed in grooves in said piston and connected to said piston by a mechanical spring which holds said seal ring away from said cylinder at a small diametrical clearance when atmospheric or low pressures act on said seal rings, said seal ring comprising a longitudinally arched member having a passage leading from its cylinder side to its piston side, said passage being located at a high pressure end of said seal ring and adapted to be positioned so that said piston side has the total pressure head as a static head, said seal ring being adapted to form with a said cylinder a nozzle and bearing surface of such configuration that part of the total head is converted to a velocity head wherein the static head on the piston side of said ring is greater than the static head on the cylinder side of said nozzle, thereby forcing said nozzle to move radially outwardly until said mechanical spring balances said fluid forces on said nozzle, the fluid flowing past said bearing surface around said seal serving to lubricate it and to prevent bearing contact with a said cylinder.

11. The device of claim 10 wherein said seal ring has on its arched portion a labyrinth shape providing labyrinthine means moving with said ring to restrict the flow of fluid past it.

12. The device of claim 11 wherein said labyrinthine means has pointed outer tips at its outer radius which are easily worn to the optimum height for restriction of the gas flow.

13. The device of claim 10 wherein said seal ring is made up of a plurality of arched arcuate segments which fit together to form said seal ring.

14. An engine comprising a piston with a head end and a crank end with constant-diameter skirt means, a cylinder wherein said piston reciprocates, the crank end of said piston having a diameter larger than the head end of said piston so that the constant diameter skirts of said crank end take all the side bearing load of the piston on the surface from the crank end to near mid-length of said piston, means for oil-lubricating the piston bearing surfaces of said skirt means, the head end of said piston, being of smaller diameter than said crank end, not taking any side bearing loads; oil rings on said skirt means to prevent the flow of lubricating oil to the head end; and gas-lubricated seal rings at the head end of said piston to reduce the leakage of high pressure gas from the head end past said piston into its crank end.

15. The device of claim 14 wherein the gas-lubricated seal rings each comprise a longitudinally arched member sealed in a groove in said piston and connected to said piston by a mechanical spring which holds said seal ring away from said cylinder with a narrow diametrical clearance when atmospheric or low pressures act on it, each said seal ring having passage means leading from its cylinder side to its piston side and providing a cavity between said seal ring and said piston, said passage being located at the high pressure end of said seal and positioned so said piston side will have the total pressure head as a static head, said seal ring and said cylinder forming a nozzle and bearing surface in such a configuration that part of the total head is converted to a velocity head wherein the static head on the piston side of said ring is greater than the static head on the cylinder side of said nozzle and forces said nozzle to move radially outward until said mechanical spring balances said fluid forces on said nozzle, the said fluid that flows past said bearing surface between said seal and said cylinder serving to lubricate these surfaces and to prevent bearing and cylinder housing contact.

16. A seal ring for a circular machine part to be sealed comprising arcuate segments which fit together to form a circular ring and a split ring circular spring which retains said segments in a groove in said circular part, said arcuate segments having spring means enabling said segments to flex away from said spring.

17. An arcuate segment for a seal ring, comprising an arched member with a tapered flexible surface near its two ends, at least one bearing surface, at least one labyrinth seal with retaining tabs at its ends, and at least one spring latch for holding said arcuate segment in a retaining groove.

18. A seal installation incorporating the segment of claim 17, comprising a cylindrical machine part having a rectangular shaped groove with a smaller rectangular shaped slot at one corner of said groove, a trapezoid shaped slot at the other corner of said groove, said trapezoid being shaped so that said spring latch and tab will snap into said trapezoidal groove when said arcuate segment is held diagonally to the rectangular groove, said trapezoid slot being deep enough so that said arcuate segment can shove said tab adjacent to latch in until said arcuate segment may have its other tab located in said rectangular slot, said spring latch holding said segment in said rectangular groove until it is released and said segment lifted out.

References Cited

UNITED STATES PATENTS

| | | | |
|---|---|---|---|
| 1,072,681 | 9/1913 | Wilson | 277—207 |
| 1,807,555 | 5/1931 | Ruggles | 277—148 |
| 2,319,098 | 5/1943 | Zahodiakin | 277—148 |

FOREIGN PATENTS

| | | |
|---|---|---|
| 610,269 | 6/1955 | Canada. |

EDGAR W. GEOGHEGAN, *Primary Examiner.*